US012497980B2

(12) United States Patent
Chen

(10) Patent No.: US 12,497,980 B2
(45) Date of Patent: Dec. 16, 2025

(54) FAN AND FAN BRACKET

(71) Applicant: LVLPLAY INC., Taipei (TW)

(72) Inventor: Yu-Shun Chen, Taipei (TW)

(73) Assignee: LVLPLAY INC., Taipei (TW)

( * ) Notice: Subject to any disclaimer, the term of this patent is extended or adjusted under 35 U.S.C. 154(b) by 0 days.

(21) Appl. No.: 18/657,787

(22) Filed: May 8, 2024

(65) Prior Publication Data

US 2024/0401611 A1 Dec. 5, 2024

Related U.S. Application Data

(60) Provisional application No. 63/469,445, filed on May 29, 2023.

(51) Int. Cl.

| | |
|---|---|
| ***F04D 29/64*** | (2006.01) |
| ***F04D 19/00*** | (2006.01) |
| ***F04D 29/52*** | (2006.01) |
| ***F21S 4/20*** | (2016.01) |
| ***F21V 23/06*** | (2006.01) |
| ***F21V 33/00*** | (2006.01) |
| ***F21Y 103/00*** | (2016.01) |

(52) U.S. Cl.

CPC ......... *F04D 29/646* (2013.01); *F04D 19/002* (2013.01); *F04D 29/522* (2013.01); *F21S 4/20* (2016.01); *F21V 23/06* (2013.01); *F21V 33/0096* (2013.01); *F21Y 2103/00* (2013.01)

(58) Field of Classification Search

CPC .... F04D 29/646; F04D 19/002; F04D 29/522; F04D 29/601; F21S 4/20; F21V 23/06; F21V 33/0096

See application file for complete search history.

(56) References Cited

U.S. PATENT DOCUMENTS

| | | | | |
|---|---|---|---|---|
| 2005/0243489 A1* | 11/2005 | Seymour | .............. | H01R 13/627 361/93.1 |
| 2007/0248460 A1* | 10/2007 | Su | ......................... | F04D 29/601 415/213.1 |
| 2019/0249862 A1* | 8/2019 | Fan | ......................... | F21V 17/12 |

FOREIGN PATENT DOCUMENTS

| | | | |
|---|---|---|---|
| CA | 3133124 A1 * 10/2020 | .............. | B01L 9/527 |
| CN | 201606280 U * 10/2010 | | |

(Continued)

OTHER PUBLICATIONS

Techpowerup, "Enermax Announces U.R.Vegas USB Rubber-Frame Fan," issued on Jun. 2011, available at: https://www.techpowerup.com/148105/enermax-announces-u-r-vegas-usb-rubber-frame-fan.

(Continued)

*Primary Examiner* — Brian Christopher Delrue
(74) *Attorney, Agent, or Firm* — JCIPRNET

(57) ABSTRACT

A fan bracket for attaching or detaching at least one fan comprising a frame, a plurality of positioning pins, a circuit board assembly, and a magnet is provided. The positioning pins disposed on the frame are inserted into a plurality of assembling holes of the fan respectively, wherein different housing parts of the fan are assembled to each other via screws locked in the assembling holes respectively. The circuit board assembly disposed in the frame has at least one first quick connector protruded out of the frame, wherein the first quick connector is mated to a second quick connector of the fan in a process of the fan assembling to the fan bracket structurally. The magnet disposed in the frame attracts to at least one magnetic conducting sheet of the fan.

12 Claims, 10 Drawing Sheets

(56) References Cited

FOREIGN PATENT DOCUMENTS

| | | | | | |
|---|---|---|---|---|---|
| CN | 105099020 B | * | 2/2019 | ........... | F04D 29/329 |
| CN | 215521327 | | 1/2022 | | |
| CN | 218829404 U | * | 4/2023 | | |
| CN | 219938853 | | 10/2023 | | |
| CN | 219938853 U | * | 10/2023 | | |
| CN | 220600050 | | 3/2024 | | |
| CN | 118855737 A | * | 10/2024 | ........... | F04D 29/646 |
| CN | 222102337 U | * | 12/2024 | | |
| KR | 100951425 B1 | * | 4/2010 | ........... | F04D 25/062 |
| TW | 200525338 | | 8/2005 | | |
| TW | M316940 | | 8/2007 | | |
| TW | 202115317 | | 4/2021 | | |
| TW | 202225565 | | 7/2022 | | |
| TW | 202244395 | | 11/2022 | | |
| TW | 202246659 | | 12/2022 | | |

OTHER PUBLICATIONS

Thermaltake USA, "SWAFAN EX12 ARGB Sync PC Cooling Fan TT Premium Edition (3-Fan Pack)," available at: https://thermaltakeusa.com/products/swafan-ex12-argb-sync-pc-cooling-fan-tt-premium-edition-3-fan-pack-cl-f167-pl12sw-a.
"Search Report of Europe Counterpart Application", issued on Jan. 29, 2025, p. 1-p. 8.

* cited by examiner

FAN AND FAN BRACKET

CROSS-REFERENCE TO RELATED APPLICATION

This application claims the priority benefit of U.S. provisional application Ser. No. 63/469,445, filed on May 29, 2023. The entirety of the above-mentioned patent application is hereby incorporated by reference herein and made a part of this specification.

BACKGROUND

Technical Field

The disclosure relates to a fan and a fan bracket.

Description of Related Art

In recent years, computing devices are making progress by leaps and bounds, and the applications of computing devices can be seen everywhere. As computer performance increases, the demand for radiators becomes higher and higher, and the number of fans is also increasing to meet the cooling needs.

Currently, screws are often used to fasten one or more fans to the radiator (heat sink) or chassis of the computer. As mentioned above, when the number of fans increases, the number of screws also increases exponentially. This is obvious a burden for users when assembling or disassembling the fans, especially when the number of screws is large, it becomes difficult to store and organize them.

Besides, after screwing the fans onto the radiator or the chassis, users have to connect each fan to the power supply or motherboard through electrical connecting wires. Each fan means at least one wire and at least one connector are provided therewith. In addition to cause assembly inconvenience, the internal wiring of the computer is complicated and messy, which can also easily affect the operation of the fan and the flow of cooling airflow. Finally, users need to spend time and additional accessories (such as zip ties) to organize these wires.

SUMMARY

This disclosure provides a fan bracket and a fan, wherein the fan is attached or detached to the fan bracket in a simple way and structure, and the fan could be electrically connected to other device via the fan bracket.

The fan bracket for attaching or detaching at least one fan thereon includes a frame, a plurality of positioning pins, a circuit board assembly, and a magnet. The plurality of positioning pins disposed on the frame is used for inserting into a plurality of assembling holes of the fan respectively, wherein different housing parts of the fan are assembled to each other via screws locking in the assembling holes respectively. The circuit board assembly disposed in the frame has at least one first quick connector protruded out of the frame, wherein the first quick connector is mated to a second quick connector of the fan. The magnet disposed in the frame attracts to at least one magnetic conducting sheet of the fan The fan includes a housing, an impeller disposed in the housing, a cross bracing, and a plurality magnetic conducting sheets. The housing has a space, an air inlet, and an air outlet, wherein the space is located between the air inlet and the air outlet so as to form a vent together with the air inlet and the air outlet. The cross bracing is assembled to the housing and located on the air outlet and supports the impeller. The magnetic conducting sheets are disposed on the cross bracing.

Based on above, the fan bracket is used for attaching or detaching at least one fan thereon. In a process of the fan assembling to the fan bracket structurally, the positioning pins of the fan bracket are respectively inserted into the screwing holes (wherein the screw is locked inside) of the fan, the magnet of the fan bracket attracts the magnetic conducting sheet of the fan, and the first quick connector of the fan bracket is electrically connected to the second quick connector of the fan. On the contrary, a user can remove the fan from the fan bracket by applying force on the fan greater than the magnetic attracting. Therefore, the above three types of assembling means in the assembling process and only one step in the disassembling process provide the user convenience with simple members so as to lower the manual loading of tool and accessory.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
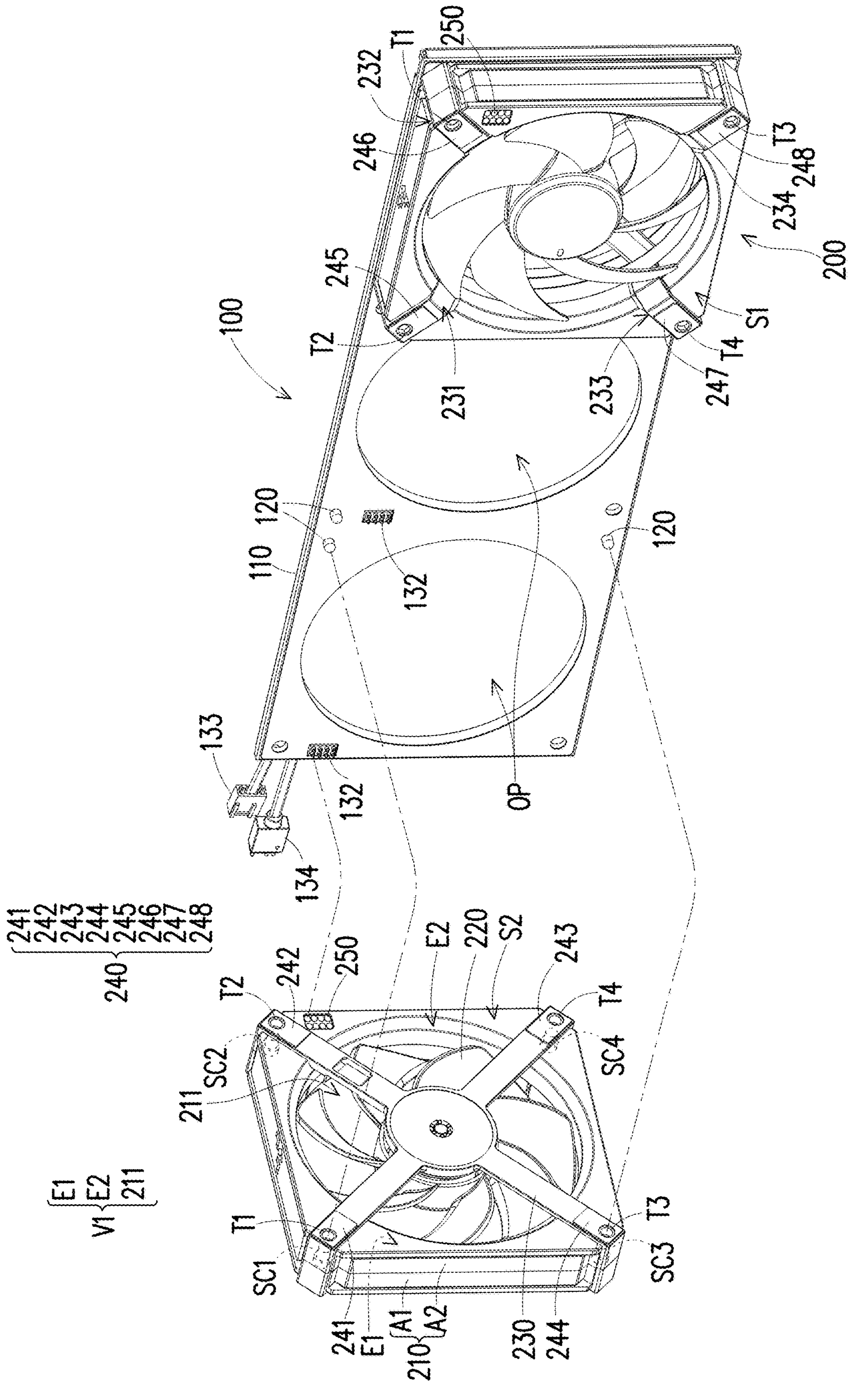
FIG. 1 is a schematic diagram of fans and a fan bracket according to an embodiment of the present disclosure.

FIG. 1 is a schematic diagram of fans and a fan bracket according to an embodiment of the present disclosure. Referring to FIG. 1, a plurality of fans 200 and a fan bracket 100 in the embodiment show relation therebetween, wherein the fan bracket 100 has three openings OP, and each opening OP is corresponding to one fan 200. FIG. 1 only shows two fans 200 merely for depicting the relation in a convenient way. In the present embodiment, the fan 200 includes a housing 210, an impeller 220 disposed in the housing 210, a cross bracing 230, and a plurality magnetic conducting sheets 241-248. The housing 210 has a space 211, an air inlet E1, and an air outlet E2, wherein the space 211 is located between the air inlet E1 and the air outlet E2 so as to form a flow vent together with the air inlet E1 and the air outlet E2. The cross bracing 230 is assembled to the housing 210 and located on the air outlet E2 and supports the impeller 220. The magnetic conducting sheets 241-248 are disposed on the cross bracing 230. The housing 210 includes two housing parts A1, A2 assembled to each other by screws SC1 locked therewith, and the screws SC1 are respectively locked and located in assembling holes T1-T4 at corners of the air outlet E2.

In FIG. 1, the fan bracket 100 includes a frame 110 having the openings OP and a plurality of positioning pins 120. In a process of assembling the fan 200 to the fan bracket 100, the positioning pins 120 are respectively inserted into the assembling holes T1-T4. It also means that the assembling holes T1-T4 provide two functions referring to fan assembling and fan-to-bracket assembling, and this can effectively reduce the difficulty of structural design and improve the versatility of members.

Though three openings OP are shown in the present embodiment, and in other embodiments not shown here, the frame could have two openings for two fans or merely one opening for one fan.

Figure 2A:
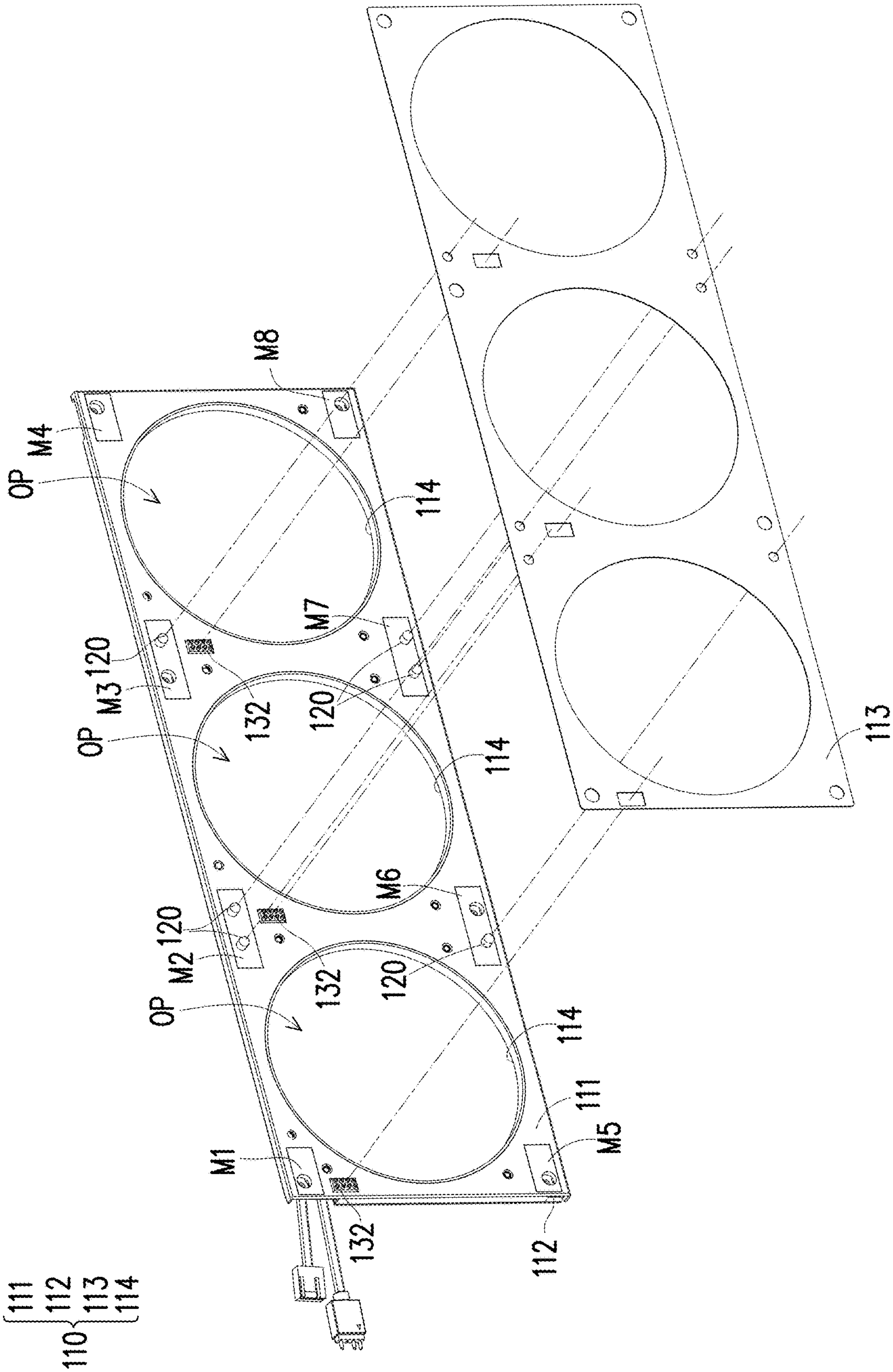
FIG. 2A to FIG. 2C are different exploded views of the fan bracket.
Figure 2B:
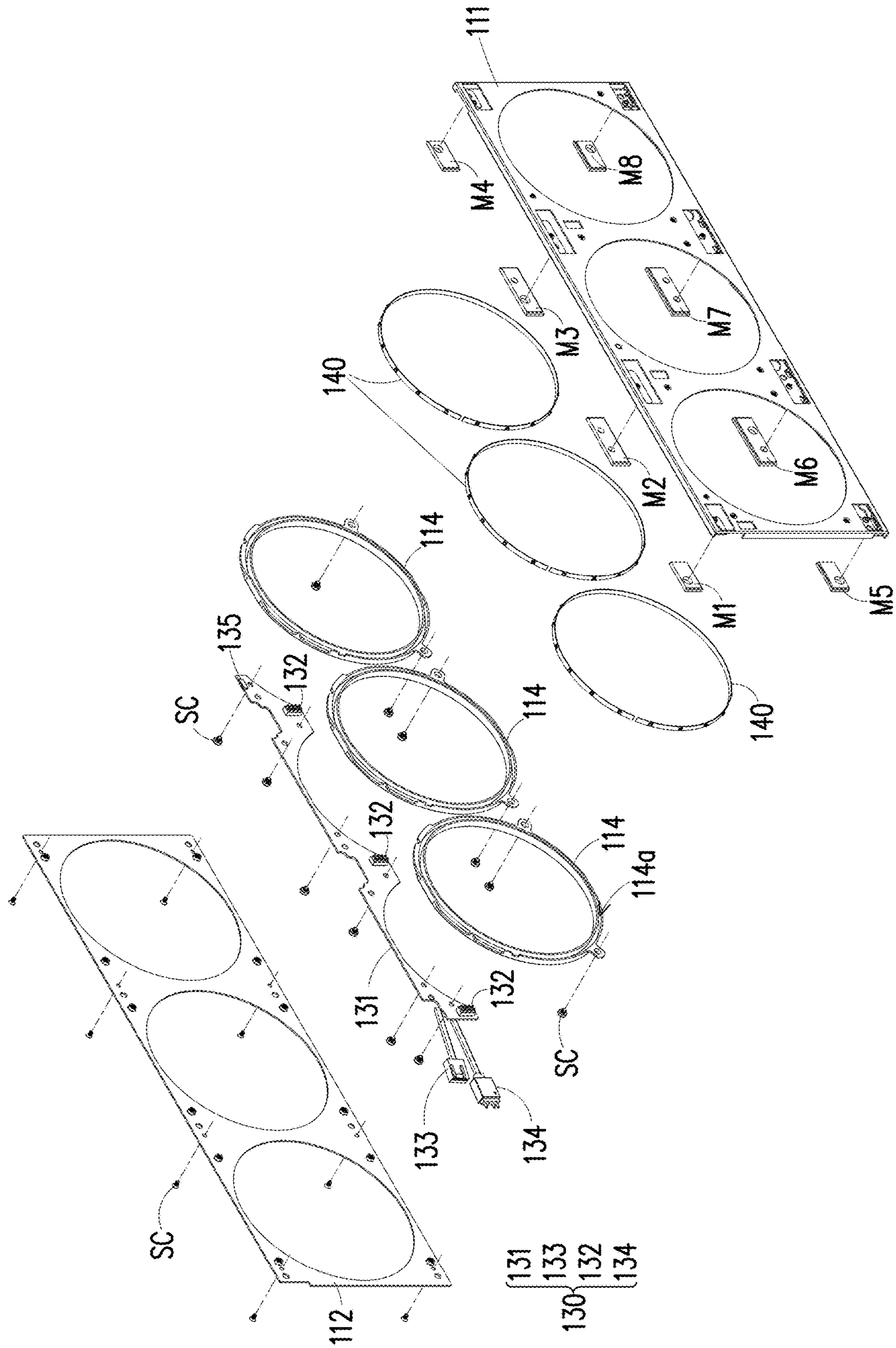
Figure 2C:
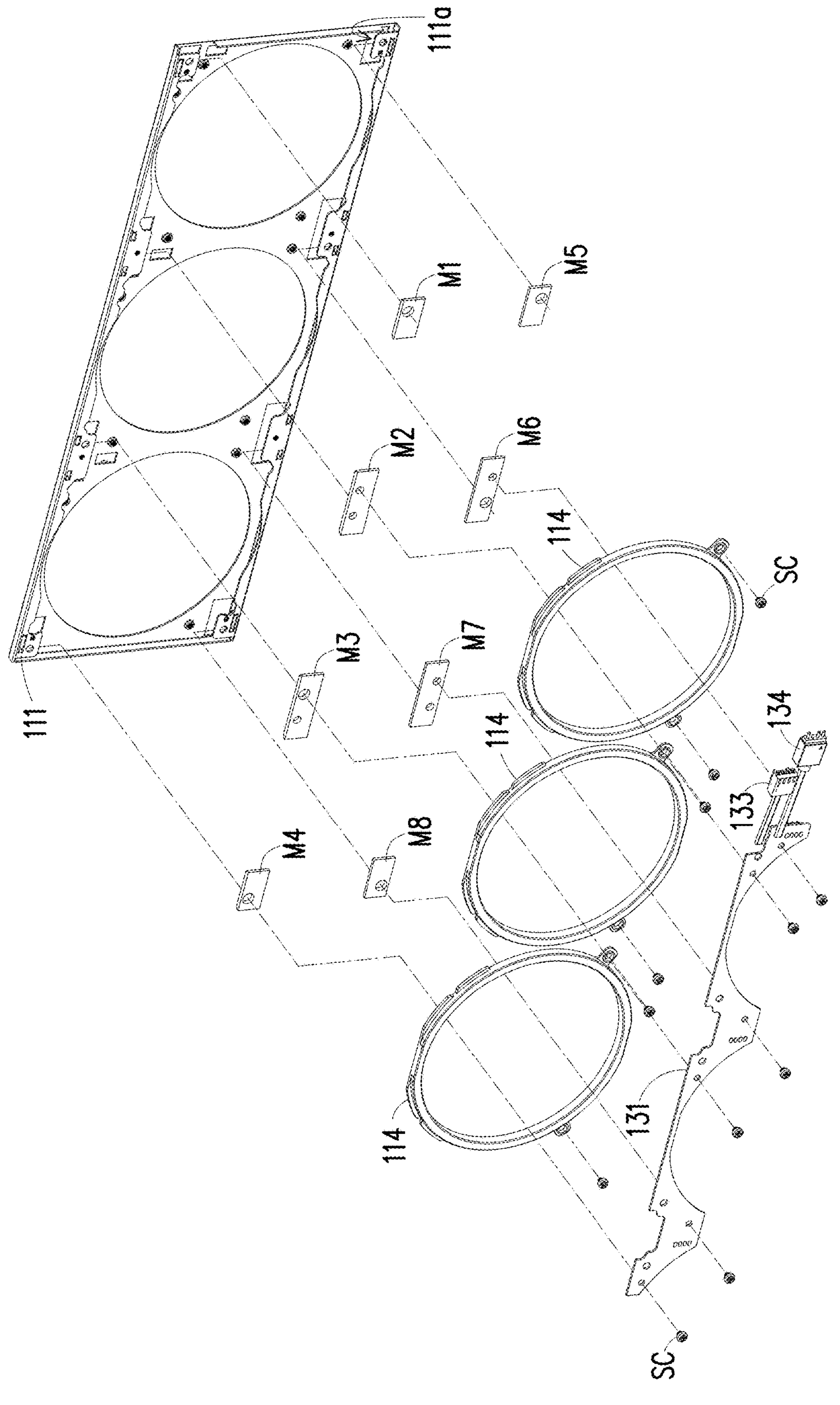

FIG. 2A to FIG. 2C are different exploded views of the fan bracket. Please refer to FIG. 1 and FIG. 2A first, the frame 110 further includes a cover 113, a front shell 111, a rear shell 112, and ring walls 114 assembled between the front shell 111 and the rear shell 112. As shown in FIG. 2A, the fan bracket 100 further includes a plurality magnets M1-M8 disposed in the frame 100, especially buckled to the front shell 111 and are exposed out of the front shell 111. The cover 113 assembled to the front shell 111 and covers the magnets M1-M8. The positioning pins 120 are assembled to and protruded from the front shell 111, and portions of the magnets M1-M8 are penetrated by the positioning pins 120.

Please refer to FIG. 1, the cross bracing 230 has four ends 231-234 extending from an outlet surface S2 to an inlet surface S1 of the housing 210 by passing four corners on the outlet surface S2 of the housing 210, the magnetic conducting sheets 245-248 are disposed at the ends 231-234, and the magnetic conducting sheets 241-244 are disposed on the cross bracing 230 and located at the four corners on the outlet surface S2 respectively.

Please refer to both FIG. 1 and FIG. 2A, after the fan 200 contacts to the frame 110, and the positioning pins 120 are inserted into the assembling holes T1-T4 respectively, the magnets M1-M8 of the fan bracket 100 attract the magnetic conducting sheets 241-244 of the fan 200 so as to assemble the fan 200 onto the frame 110, and the flow vent of the fan 200 matching to the opening OP of the fan bracket 100. As shown in FIG. 1, there further are magnetic conducting sheets 245-248 on the inlet surface S1 of the fan 200 to be attracted to the magnets M1-M8. Therefore, the opposite surfaces of the fan 200, the inlet surface S1 and the outlet surface S2, can be magnetic attracted to the frame 110 respectively, and the user can assemble the fan 200 onto the fan bracket 100 by contacting the inlet surface S1 or the outlet surface S2 to the frame 1120 according to usage requirement.

Please refer to FIG. 2B and FIG. 2C, the fan bracket 100 of the present embodiment further includes a circuit board assembly 130, and the circuit board assembly 130 includes a circuit board 131, a first quick connector 132, cable connectors 133, 134, and output connector 135. The circuit board 131 is disposed between the front shell 111 and the rear shell 112 of the frame 110. The first quick connector 132, a pogo pin connector, is disposed on the circuit board 131. The cable connector 133, 134 are extended from the circuit board 131 and also protrudes out of the frame 110, wherein the cable connector 133 is used for transferring electric power and signal. In the present embodiment, the frame 110 has three openings OP and a rectangular border, the openings OP are located inside the rectangular border, such that the circuit board 131 has to fit an area between the rectangular border and the openings OP. In the process of assembling the fan 200 onto the fan bracket 100, the fan 200 has a second quick connector 250 abutted to the first quick connector 132 at the same time of the outlet surface S2 in contact with the frame 110. In other words, the positioning step, the magnetic attracting step, and the electrical connecting step can be completed by bringing the fan 200 close to the frame 110 of the fan bracket 100.

Please refer to FIG. 2C and comparing to FIG. 2B, the circuit board 131 and the ring walls 114 are assembled to the front shell 111 by screws SC. The front shell 111 further has recesses 111*a* by bending the main plate portion, such that the magnets M1-M8 are inserted into the recesses 111*a* respectively.

Please refer to FIG. 2A to FIG. 2C, the ring wall 114 disposed between the front shell 111 and the rear shell 112 forms the openings OP together with the front shell 111 and the rear shell 112, and the fan bracket 100 further includes lighting bars 140 inserted into recesses 114*a* of the ring walls 114 respectively, electrically connected to the circuit board 131, and each surrounding the opening OP. Besides, the ring wall 114 is made of transparent material, and the light generated from the lighting bars 140 projects out of the openings OP of the frame 110 by penetrating the ring walls 114, and the cable connector 134 is used for transferring Addressable RGB signal to the lighting bar 140.

Figure 3A:
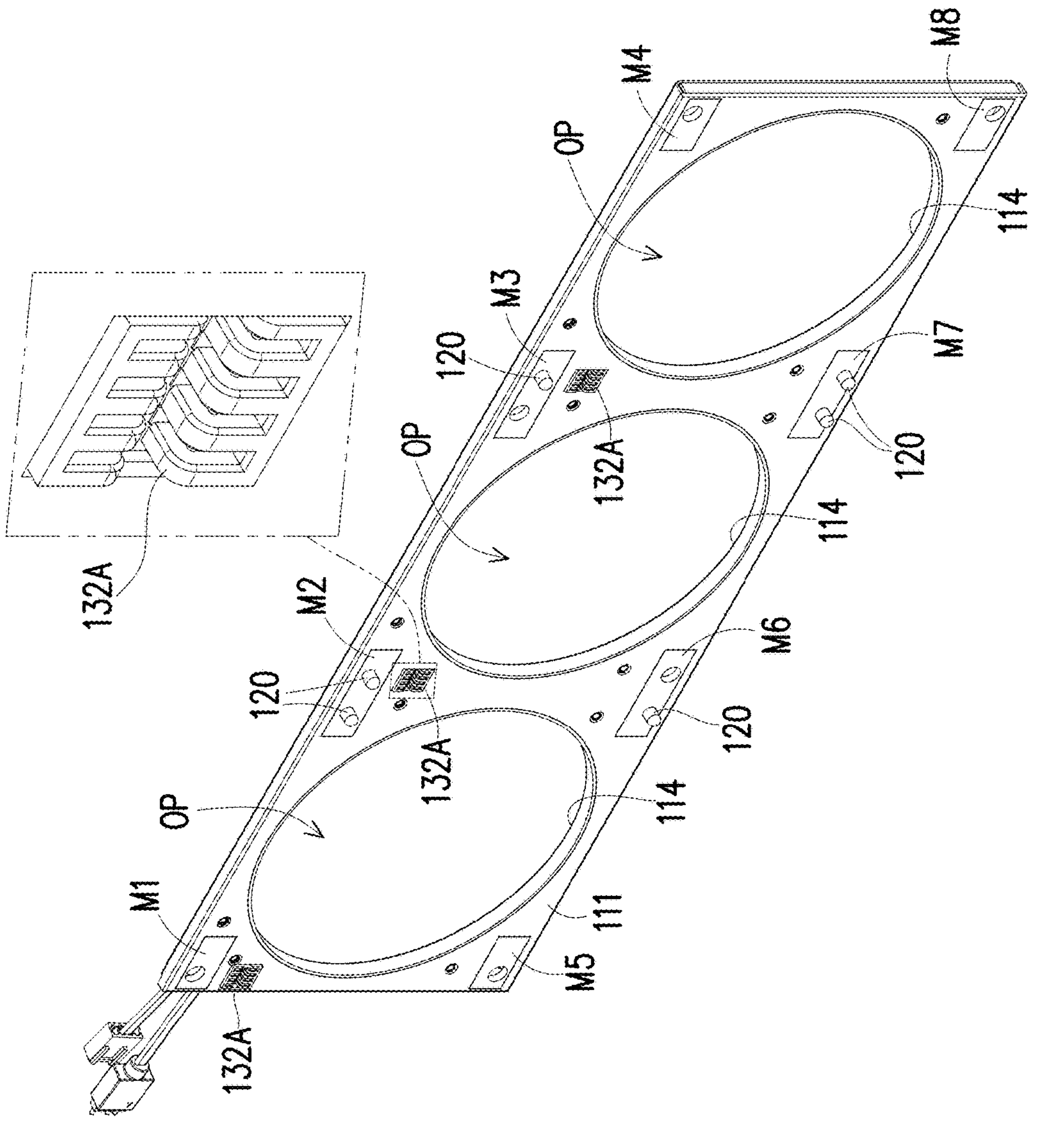
FIG. 3A and FIG. 3B are schematic diagrams of the fan bracket respectively according to different embodiments of the present disclosure.
Figure 3B:
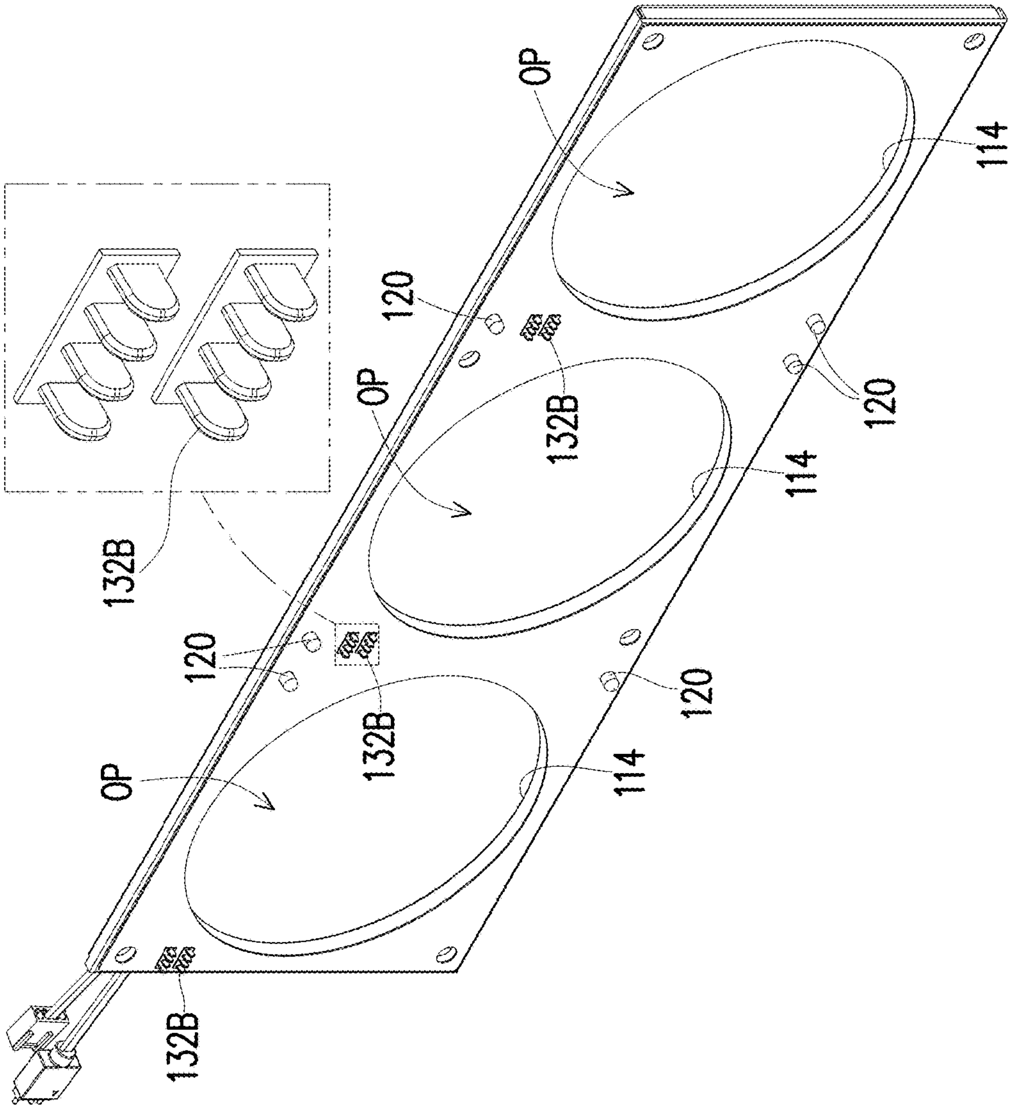

FIG. 3A and FIG. 3B are schematic diagrams of the fan bracket respectively according to different embodiments of the present disclosure. Please refer to FIG. 3A first, it is different from the previous embodiment that the first quick connector 132A of the present embodiment, which shows a plurality of terminals arranged in two rows and a recess is formed therebetween for mating a second quick connector (of the fan) having a plate piece with conducting pads on opposite surfaces of the plate piece. Please refer to FIG. 3B, it is different from the previous embodiments that the first quick connector 132B having a plurality of blade terminals for mating a second quick connector (of the fan) having a plurality of holes respectively have conducting terminals inside the holes, the blade terminals are inserted into the holes to contact the conducting terminals.

FIG. 4 to FIG. 7 are schematic diagrams of the fan bracket with relation to different devices according to different embodiments of the present disclosure. Please refer to FIG. 4 first, it is disclosed that a mainboard 300 of a computer is electrically connected to a water coolant device 400 via two fan brackets 100A, 100B and cable connectors CB1-CB3. Each of the fan brackets 100A, 100B includes circuit boards 131A, 131B inside the frame 110 and connectors CN1, CN2 disposed at opposite ends of the circuit board 131A, 131B. Therefore, the fan bracket 100A is electrically connected to the mainboard 300 via a cable connector CB1, the fan brackets 100A, 100B is electrically connected to each other via the cable connector CB2, and the fan bracket 100B is electrically connected to the water coolant device 400 via the cable connector CB3. That's to say, the fan brackets 100A, 100B can be electrical connection between two devices, which is beneficial to wiring layout in the computer. When the fan brackets 100A, 100B are assembled to a chassis of computer, connecting wires between two devices can be saved, and this can effectively organize the space inside the chassis to prevent wires from taking up the space. In another embodiment not shown, the fan brackets 100A, 100B can be connected by abutting (or docking) their frames together via magnetic attracting or mechanical latch, and the first quick connector disposed in fan bracket 100A is connected to the second quick connector disposed in the fan bracket 100B during above abutting (or docking) process. Therefore, the cable connector CB2 shown in FIG. 4 can be further omitted.

Figure 4:
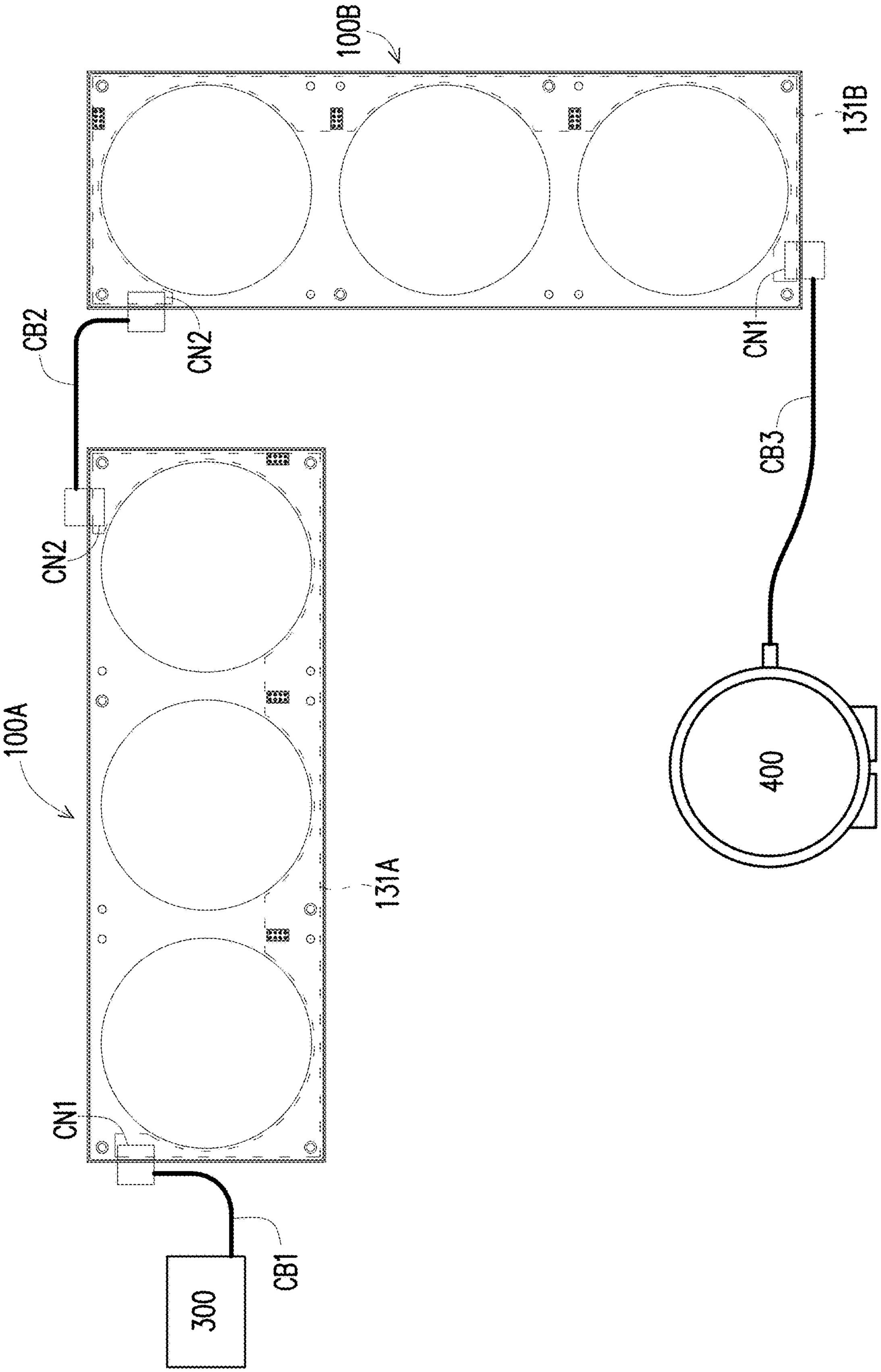
FIG. 4 to FIG. 7 are schematic diagrams of the fan bracket with relation to different devices according to different embodiments of the present disclosure.

In the embodiment of FIG. 4, at least one fan 200 could be attached onto the fan bracket 100A, 100B, but omitted in FIG. 4 for clearly identifying the component (the circuit board).

Figure 5:
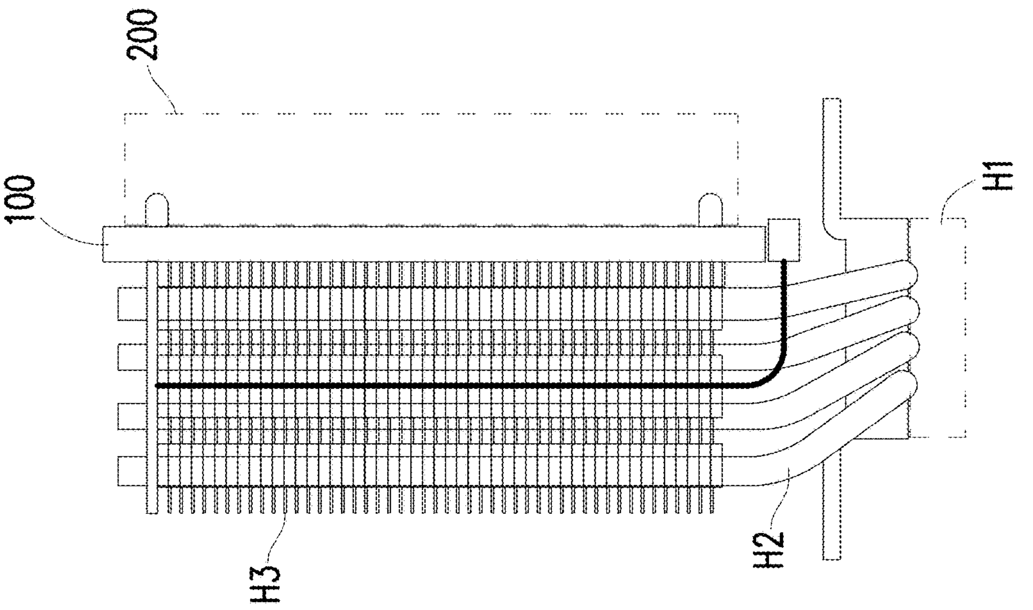

Please refer to FIG. 5, it is disclosed that the fan bracket 100 is assembled to a heat dissipation fin module H3 with a fan 200, and heat pipes H2 is thermal connected between a heat source H1 and the heat dissipation fin module H3, such that the heat generated from the heat source H1 is transferred to the heat dissipation fin module H3 via the heat pipes H2. An airflow generated by the fan 200 passes through the opening of the fan bracket 100 and flows toward the heat dissipation fin module H3 to dissipate heat therefrom.

Figure 6:
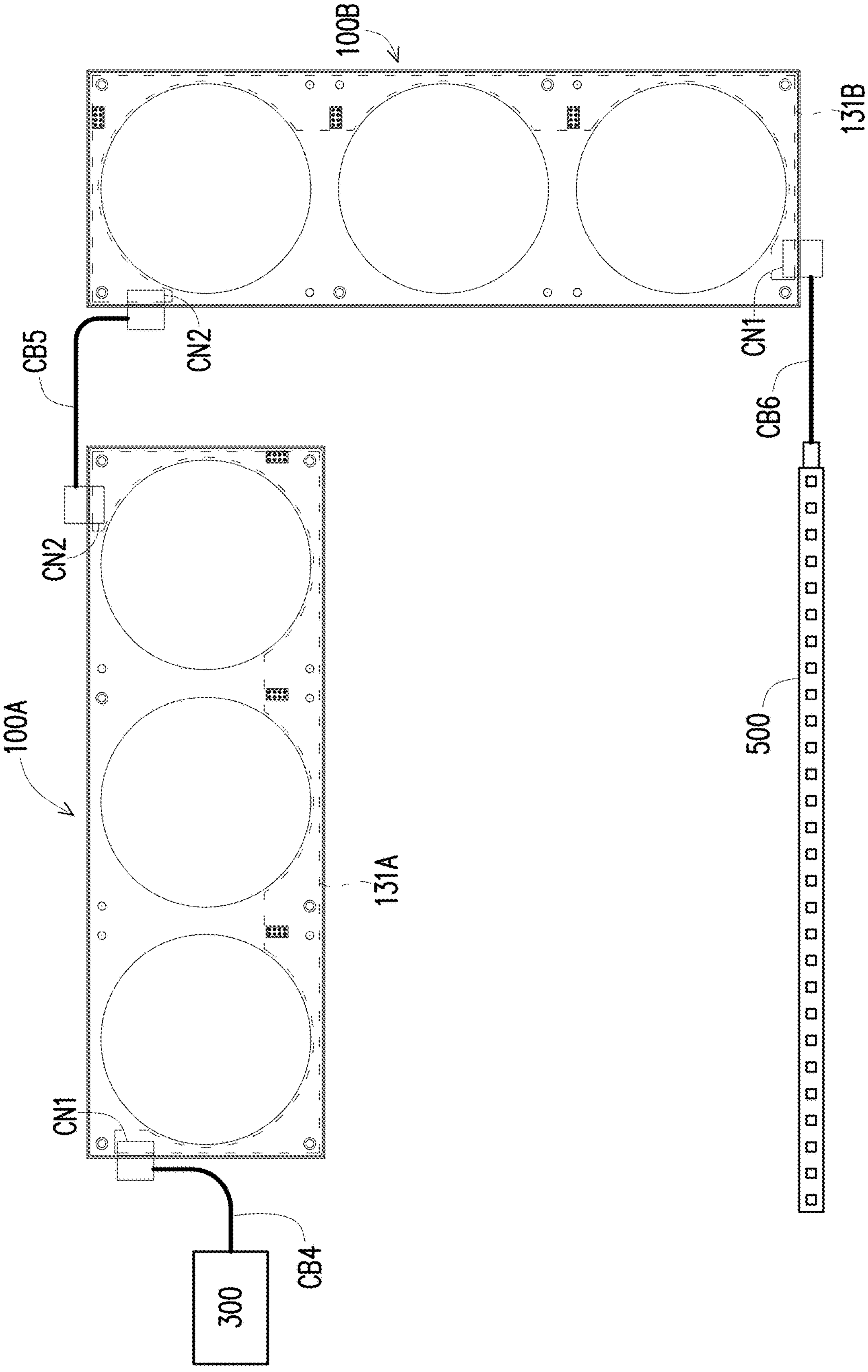

Please refer to FIG. 6, it is similar to FIG. 4 that the fan brackets 100A, 100B are electrically connected between the mainboard 300 and a lighting bar 500. Therefore, the same technical features as those in the previous embodiment are omitted here. In the present embodiment, the fan brackets 100A, 100B are connected via the cable connector CB5, the mainboard 300 is connected to the fan bracket 100A via the cable connector CB4, and the lighting bar 500 is connected to the fan bracket 100B via the cable connector CB6.

Figure 7:
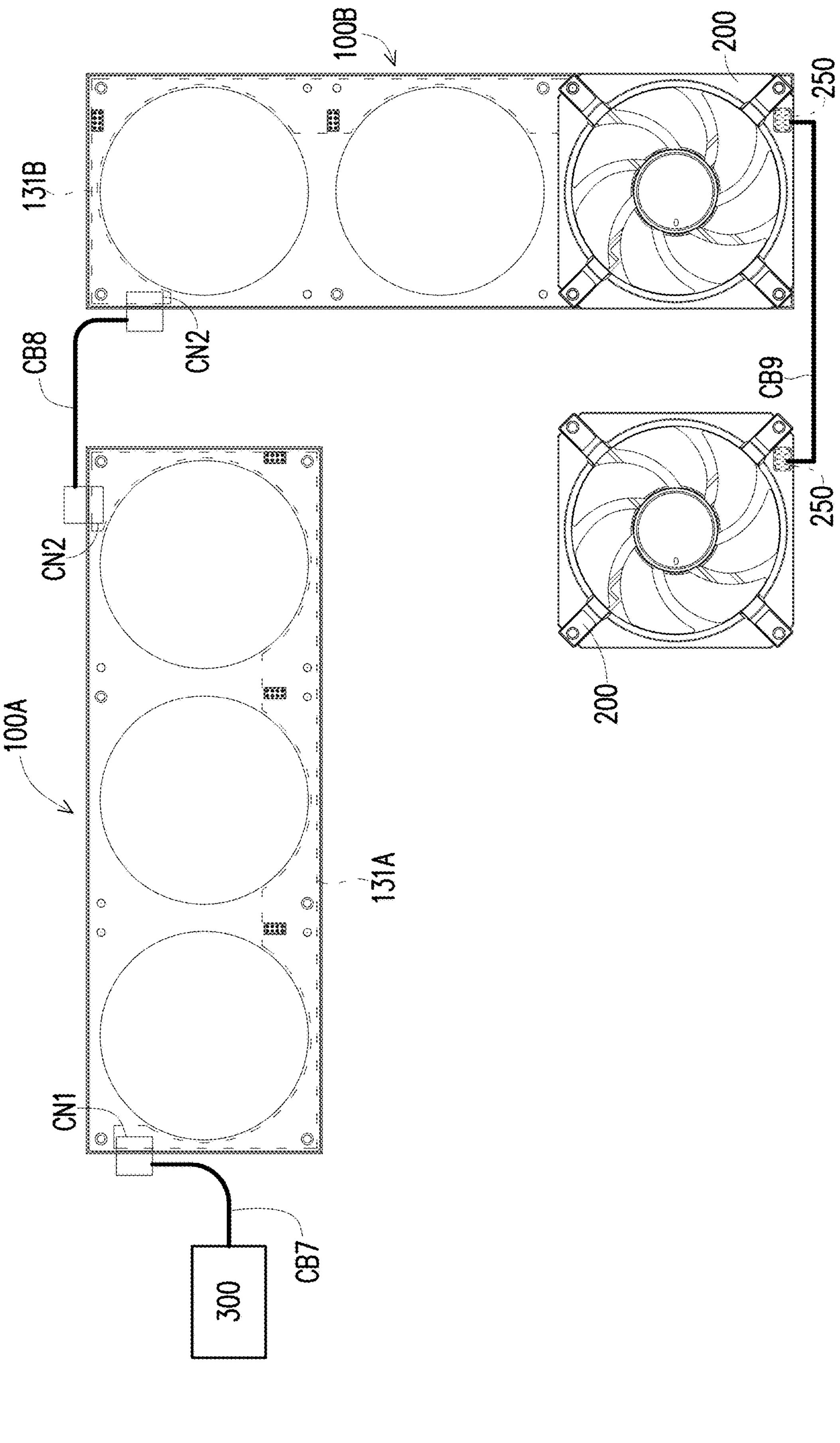

Please refer to FIG. 7, it is disclosed that the fan brackets 100A, 100B can be electrically connected between the mainboard 300 and another fan 200. For example, in a chassis of a computer, in addition to directly dissipate heat from the heat source by fan 200, the guiding of airflow in the chassis also needs to be considered, such that additional fan 200 is needed to be assembled to the chassis structure, and the member and the layout in FIG. 7 can be used. In the present embodiment, the mainboard 300 is connected to the fan bracket 100A via the cable connector CB7, the fan brackets 100A, 100B are connected via the cable connector CB8, and the two fans 200 are connected to each other via the cable connector CB9 and second quick connectors 250.

Based on above, the fan bracket is used for attaching or detaching at least one fan thereon. In a process of the fan assembling to the fan bracket structurally, the positioning pins of the fan bracket are respectively inserted into the screwing holes (wherein the screw is locked inside) of the fan, the magnet of the fan bracket attracts the magnetic conducting sheet of the fan, and the first quick connector of the fan bracket is electrically connected to the second quick connector of the fan. On the contrary, a user can remove the fan from the fan bracket by applying force on the fan greater than the magnetic attracting.

Therefore, the above three types of assembling means in the assembling process and only one step in the disassembling process provide the user convenience with simple members so as to lower the manual loading of tool and accessory.

Besides, the fan bracket can be electrical connection between two or more different devices because the circuit board and connector have been set in the frame. In other words, the structural and electrical connections are combined together in the fan bracket, so as to provide the users more choices in building their computers in further after the cooling need being met.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fan bracket for attaching or detaching at least one fan thereon, comprising:

a frame;

a plurality of positioning pins, disposed on the frame, inserted into a plurality of assembling holes of the fan respectively, wherein different housing parts of the fan are assembled to each other via screws locked in the assembling holes respectively;

a circuit board assembly, disposed in the frame, having at least one first quick connector protruded out of the frame, wherein the first quick connector is mated to a second quick connector of the fan in a process of the fan assembling to the fan bracket structurally; and a magnet, disposed in the frame and attracting to at least one magnetic conducting sheet of the fan.

2. The fan bracket according to claim 1, wherein the frame has an opening matching a flow vent of the fan.

3. The fan bracket according to claim 2, wherein the frame has a rectangular border, the opening is located inside the rectangular border, and the circuit board assembly further comprises a circuit board disposed in the frame to fit an area between the rectangular border and the opening.

4. The fan bracket according to claim 2, further comprising:

at least one lighting bar disposed in the frame and surrounding the opening, wherein the lighting bar is electrically connected to a circuit board of the circuit board assembly.

5. The fan bracket according to claim 4, wherein the circuit board assembly further comprises a cable connector connected to the circuit board for transferring Addressable RGB signal to the lighting bar.

6. The fan bracket according to claim 2, further comprising:

a lighting bar disposed in the frame, surrounding the opening, and electrically connected to the circuit board assembly.

7. The fan bracket according to claim 6, wherein the frame comprises a front shell, a rear shell, a ring wall assembled between the front shell and the rear shell to form the opening, and the lighting bar is inserted into a recess of the ring wall.

8. The fan bracket according to claim 7, wherein the light generated by the lighting bar penetrating and projects out of the ring wall.

9. The fan bracket according to claim 1, wherein the at least one fan comprises a plurality of fan, the frame has a plurality of openings matching flow vents of the fans respectively, the circuit board assembly further comprises a circuit board disposed in the frame to fit an area between the rectangular border and the openings, the at least one first quick connector comprises a plurality of first quick connectors disposed on the circuit board, and the first quick connectors are next to the openings respectively.

10. The fan bracket according to claim 1, wherein the frame comprises a front shell and a rear shell assembled to each other, the circuit board assembly comprises a circuit board screwed to the front shell, the front shell has a recess formed by bending a main plate of the front shell, and the magnet is assembled to the front shell.

11. The fan bracket according to claim 1, wherein the circuit board assembly further comprises a cable connector extending out of the frame for transferring electric power and signal.

12. A fan, comprising:

a housing, having a space, an air inlet, and an air outlet, wherein the space is located between the air inlet and the air outlet so as to form a flow vent together with the air inlet and the air outlet;

an impeller, disposed in the housing;

a cross bracing, assembled to the housing, located on the air outlet, and supporting the impeller;

a plurality of magnetic conducting sheets, disposed on the cross bracing; and a quick connector, disposed in and exposed out of the housing, wherein the cross bracing has four ends extending from an outlet surface to an inlet surface of the housing by passing corners on the outlet surface of the housing, a portion of the magnetic conducting sheets are disposed at the ends, and another portion of the magnetic conducting sheets are disposed on the cross bracing and located at the corners respectively.

* * * * *